United States Patent
Fuchsbauer et al.

(10) Patent No.: US 9,476,374 B2
(45) Date of Patent: Oct. 25, 2016

(54) METHOD AND DEVICE FOR REDUCING THE EMISSION OF NITROUS OXIDE

(71) Applicant: Robert Bosch GmbH, Stuttgart (DE)

(72) Inventors: Alexandra Fuchsbauer, Stuttgart (DE); Uwe Mueller, Cleebronn (DE); Matthias Walz, Wiernsheim (DE); Guido Porten, Wiernsheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 57 days.

(21) Appl. No.: 14/520,237

(22) Filed: Oct. 21, 2014

(65) Prior Publication Data

US 2015/0107229 A1    Apr. 23, 2015

(30) Foreign Application Priority Data

Oct. 22, 2013   (DE) .................... 10 2013 221 421

(51) Int. Cl.

| | |
|---|---|
| *F01N 3/08* | (2006.01) |
| *F01N 3/20* | (2006.01) |
| *F02D 41/02* | (2006.01) |
| *F02D 41/00* | (2006.01) |
| *F01N 3/10* | (2006.01) |
| *F01N 13/00* | (2010.01) |

(52) U.S. Cl.
CPC ......... *F02D 41/0275* (2013.01); *F01N 3/0842* (2013.01); *F01N 3/0871* (2013.01); *F01N 3/101* (2013.01); *F01N 3/2066* (2013.01); *F01N 3/2073* (2013.01); *F01N 13/009* (2014.06); *F01N 13/0097* (2014.06); *F01N 13/011* (2014.06); *F02D 41/0082* (2013.01); *F01N 2610/02* (2013.01); *Y02T 10/22* (2013.01); *Y02T 10/24* (2013.01)

(58) Field of Classification Search
CPC .... F01N 3/0842; F01N 3/0871; F01N 3/101; F01N 3/2066; F01N 3/2073; F01N 13/0097; F01N 13/009; F01N 13/011; F01N 2610/02; F02D 41/0082; F02D 41/0275
See application file for complete search history.

(56) References Cited

U.S. PATENT DOCUMENTS

| | | | | |
|---|---|---|---|---|
| 2011/0277450 A1* | 11/2011 | Hoyer | ................... | F01N 3/0814 60/274 |
| 2013/0028818 A1* | 1/2013 | Eckhoff | ................ | F01N 3/0814 423/212 |

FOREIGN PATENT DOCUMENTS

| | | |
|---|---|---|
| DE | 103 93 184 | 9/2005 |
| DE | 10 2010 014 468 | 10/2011 |

* cited by examiner

*Primary Examiner* — Audrey K Bradley
(74) *Attorney, Agent, or Firm* — Norton Rose Fulbright US LLP

(57) ABSTRACT

In a method for regeneration of nitrogen oxide storage catalytic converters in the exhaust gas tract of a gasoline engine assigned an exhaust aftertreatment system in the form of a Y system including two three-way catalytic converters, two downstream nitrogen oxide storage catalytic converters, one shared catalytic converter for selective catalytic reduction, and a rear nitrogen oxide storage catalytic converter, a first part of the exhaust gas in the first exhaust bank is set to rich and a second part of the exhaust gas in the second exhaust bank is set to lean in a first regeneration phase and subsequently, the second part of the exhaust gas in the second exhaust bank is set to rich and the first part of the exhaust gas in the first exhaust bank is set to lean in a second regeneration phase.

5 Claims, 1 Drawing Sheet

METHOD AND DEVICE FOR REDUCING THE EMISSION OF NITROUS OXIDE

BACKGROUND OF THE INVENTION

1. Field of the Invention

The present invention relates to a method for reducing the emission of nitrous oxide during or after a regeneration of nitrogen oxide storage catalytic converters in the exhaust gas tract of a gasoline engine which is operated predominantly lean, a first part of the exhaust gas of the gasoline engine being supplied to a first three-way catalytic converter in a first exhaust bank and to a first nitrogen oxide storage catalytic converter connected downstream, a second part of the exhaust gas of the gasoline engine being supplied to a second three-way catalytic converter in a second exhaust bank and to a second nitrogen oxide storage catalytic converter connected downstream, and the exhaust gas being subsequently merged in a shared exhaust gas tract and being supplied to a catalytic converter for selective catalytic reduction (SCR) and to a third nitrogen oxide storage catalytic converter connected downstream. The present invention further relates to a corresponding device for carrying out the method according to the present invention.

2. Description of the Related Art

For lean operated gasoline engines it is known to provide an exhaust aftertreatment using a three-way catalytic converter and a downstream nitrogen oxide storage catalytic converter. Exhaust emission control takes place in the stochiometric operation of the gasoline engine with the aid of the three-way catalytic converter. The nitrogen oxide storage catalytic converter, also referred to as a nitrogen oxide storage/reduction catalytic converter or NSC, stores the nitrogen oxides which arise during lean operation. Nitrogen oxide storage catalytic converters work discontinuously in a mode which includes two phases: In the first, longer phase, the so-called lean phase (lambda>1), the nitrogen oxides of the engine which are contained in the exhaust gas are stored. In the second, shorter phase, the so-called rich phase (lambda<1), the stored nitrogen oxides are regenerated with the aid of rich exhaust gas which is generated within the engine. During the regeneration, only nitrogen ($N_2$), water ($H_2O$) and carbon dioxide ($CO_2$) are formed from the stored nitrogen oxides in the case of the usual operating mode of an NSC.

During the regeneration phase (lambda<1) of the nitrogen oxide storage catalytic converter, ammonia ($NH_3$) may be formed there in secondary reactions under certain operating conditions of the engine, such as at a low temperature of the three-way catalytic converter. The ammonia causes nitrous oxide (laughing gas, $N_2O$) to be formed in the nitrogen oxide storage catalytic converter. Nitrous oxide has a very high global warming potential. For this reason, the emission of nitrous oxide is subject to a strict limiting value, for example in the USA.

A known possibility of reducing the emission of nitrous oxide is the additional use of a catalytic converter for selective catalytic reduction (SCR catalytic converter) upstream from the nitrogen oxide storage catalytic converter. The ammonia generated in the three-way catalytic converter is stored in the SCR catalytic converter and converted with the arising $NO_x$ or directly with the existing $NO_x$ during lean operation.

A method is known from the published German patent application document DE102010014468A1 for reducing harmful exhaust gases of a lean operated internal combustion engine by using an exhaust aftertreatment system including a first $NO_x$ storage catalytic converter which is positioned upstream and followed by an $N_2O$ reduction catalytic converter, including the steps:

a) conveying a lean exhaust gas through the $NO_x$ storage catalytic converter during normal operation;
b) supplying an exhaust gas having $\lambda \leq 1$ to the $N_2O$ reduction catalytic converter shortly before or simultaneously with the initiation of step c);
c) conveying an exhaust gas mixture having $\lambda \leq 1$ through the $NO_x$ storage catalytic converter until the latter is sufficiently regenerated;
d) discontinuing normal operation.

In the illustrated exemplary embodiments, the exhaust gas is conveyed, in this case, in a single-flow exhaust gas tract through a three-way catalytic converter, an $NO_x$ storage catalytic converter as well as a final $N_2O$ reduction catalytic converter. The $N_2O$ reduction catalytic converter may be designed as a three-way catalytic converter, as an $NO_x$ reduction catalytic converter, as an $NO_x$ storage catalytic converter, or as an oxidation catalytic converter. According to the present invention, rich exhaust gas is conveyed past the $NO_x$ storage catalytic converter to the $N_2O$ reduction catalytic converter simultaneously or shortly before the regeneration of the $NO_x$ storage catalytic converter. In this way, a sufficient amount of reduction agent at the $N_2O$ reduction catalytic converter is available for the purpose of reducing the occurring nitrous oxide during the regeneration of the $NO_x$ storage catalytic converter.

In contrast thereto, exhaust systems are known which are constructed in a so-called Y system. The exhaust system is, in this case, implemented in two exhaust gas tracts (banks), which are close to the engine and which are assigned to two cylinder groups of the internal combustion engine, and a downstream, joint exhaust gas tract. A three-way catalytic converter (TWC) and a nitrogen oxide storage catalytic converter may be situated in each of the exhaust gas tracts which are close to the engine, and an SCR catalytic converter for selective catalytic reduction of $NO_x$ using ammonia as the reduction agent as well as a downstream nitrogen oxide storage catalytic converter may be situated in the joint exhaust gas tract.

In such a Y system, ammonia is formed at the two three-way catalytic converters during the regeneration of the nitrogen oxide storage catalytic converters using a rich exhaust gas mixture. At the two front nitrogen oxide storage catalytic converters, no or only very little nitrous oxide is formed therefrom since they are relatively hot during operation. The ammonia is stored in the SCR catalytic converter, whereby no or only little nitrous oxide is generated even in a cold, rear nitrogen oxide storage catalytic converter. If, however, another lean operation does not take place in such a system after the regeneration of the nitrogen oxide storage catalytic converter, ammonia remains stored at low SCR temperatures and is then discharged at higher SCR temperatures. This ammonia reacts in the downstream nitrogen oxide storage catalytic converter to become nitrous oxide. It is possible in gasoline engines, in particular, that the regeneration is followed by a regular operating phase in the case of a stochiometric or rich air/fuel mixture, thus resulting in the above-described formation of nitrous oxide.

The published German patent application document DE10393184T5 describes a system for treating exhaust gases which are emitted by a vehicle, including:

a) a multi-cylinder diesel engine including a first exhaust manifold in flow connection with a first plurality of cylinders and a second exhaust manifold in flow connection with a deviating, second plurality of cylinders, b) a first NO$_x$ absorption catalytic converter in a first exhaust branch in flow connection with the first manifold,
c) a second NO$_x$ absorption catalytic converter in a second exhaust branch in flow connection with the second manifold,
d) a shared exhaust branch having an inlet in flow connection with the first and the second exhaust branches downstream from the first and the second NO$_x$ catalytic converter, an oxidation catalytic converter being situated in the shared exhaust branch through which exhaust gases flow from the first and the second branches after being merged in the shared exhaust branch, and
e) an ECU means which controls the composition of exhaust gases in the first exhaust manifold independently of the composition of the exhaust gases in the second exhaust manifold according to a programmed routine for the purpose of periodically generating rich gases in the one exhaust manifold and lean gases in the other exhaust manifold.

The publication thus provides a system and a method for regenerating nitrogen oxide storage catalytic converters in multi-cylinder diesel engines having a Y exhaust system including two exhaust manifolds, in each of which a nitrogen oxide storage catalytic converter is provided. The exhaust manifolds are followed by a shared exhaust branch including an oxidation catalytic converter. To regenerate the nitrogen oxide storage catalytic converters, in a first step, a first cylinder bank is operated rich and a second cylinder bank is operated lean so that in one exhaust manifold, a rich exhaust gas is present and in the second exhaust manifold, a lean exhaust gas is present. The nitrogen oxide storage catalytic converter which is exposed to the rich exhaust gas is regenerated while NO$_x$ from the lean exhaust gas is absorbed by the second nitrogen oxide storage catalytic converter. In a next step, the first cylinder bank is operated lean and the second cylinder bank is operated rich, and the second nitrogen storage catalytic converter is regenerated. The control of the exhaust gas composition takes place in both steps in such a way that the joint exhaust gas flow remains lean so that the oxidation catalytic converter is able to oxidize the excessive reduction agent (HC, CO) and thus prevent a reduction agent slip.

According to the description, the method and the system may also be used for gasoline-operated lean engines.

The method thus allows for the emission of HC and CO to be reduced during the regeneration of nitrogen oxide storage catalytic converters in a Y exhaust system. What is not described is the prevention of the emission of nitrous oxide in a Y exhaust system which is formed at a nitrogen oxide storage catalytic converter from the ammonia which is generated at a three-way catalytic converter, which is connected upstream, during the regeneration phase of nitrogen oxide storage catalytic converters.

It is thus the object of the present invention to provide a method, with the aid of which the emission of nitrous oxide may be reduced in gasoline engines which are predominantly operated lean and include a Y exhaust system.

A further object of the present invention is to provide a corresponding device for carrying out the method.

BRIEF SUMMARY OF THE INVENTION

The object of the present invention which is related to the method is achieved in that for the regeneration of nitrogen oxide storage catalytic converters, the first part of the exhaust gas in the first exhaust bank is set to rich and the second part of the exhaust gas in the second exhaust bank is set to lean in a first regeneration phase until the first nitrogen oxide storage catalytic converter is regenerated, and in that subsequently, the second part of the exhaust gas in the second exhaust bank is set to rich and the first part of the exhaust gas in the first exhaust bank is set to lean in a second regeneration phase until the second nitrogen oxide storage catalytic converter and the third nitrogen oxide storage catalytic converter are regenerated.

During the first regeneration phase, the first nitrogen oxide storage catalytic converter is regenerated entirely and the third, shared nitrogen oxide storage catalytic converter is regenerated at least partially. Ammonia is formed at the first three-way catalytic converter in the process. At the first nitrogen oxide storage catalytic converter which directly connects to the first three-way catalytic converter, there is no or only very little formation of nitrous oxide due to the relatively high temperatures. The second exhaust bank is operated slightly lean, and therefore, an NO$_x$ mass flow is generated on the bank. In the following catalytic converter for selective catalytic reduction, the ammonia from the first exhaust bank reacts with the nitrogen oxide from the second exhaust bank. Consequently, no ammonia reaches the third nitrogen oxide storage catalytic converter, whereby the emission of nitrous oxide is largely prevented. The exhaust gas composition in the first exhaust bank must be sufficiently rich in this case in order to also enable a regeneration of the third nitrogen oxide storage catalytic converter and to prevent a nitrogen oxide slip.

After the regeneration of the first nitrogen oxide storage catalytic converter and an at least partial regeneration of the third nitrogen oxide storage catalytic converter during the first regeneration phase, the first exhaust bank is initially set to lean and then the second exhaust bank is set to rich to carry out the second regeneration phase. During the second regeneration phase, the regeneration of the second nitrogen oxide storage catalytic converter and the final regeneration of the third nitrogen oxide storage catalytic converter take place analogously to the first regeneration phase. The second regeneration is completed when all three nitrogen oxide storage catalytic converters are regenerated.

The sequential procedure may largely prevent the emission of nitrous oxide in the above-described Y exhaust system.

For this purpose, it may be provided that during the first regeneration phase, the compositions of the first part of the exhaust gas and of the second part of the exhaust gas are selected in such a way that after the completion of the first regeneration phase, at least a residual quantity of ammonia remains stored in the catalytic converter for selective catalytic reduction. During the adjustment from the first regeneration phase to the second regeneration phase, the exhaust bank which was regenerated first is preferably initially set to slightly lean. The nitrogen oxide which is now available reacts with the ammonia which is stored in the catalytic converter for the selective catalytic reduction.

In order to ensure the regeneration of the third, shared nitrogen oxide storage catalytic converter, it may be provided that during the first regeneration phase and the second regeneration phase, the exhaust gas compositions in the first exhaust bank and in the second exhaust bank are selected in such a way that a rich exhaust gas mixture is present in the shared exhaust gas tract.

The method may be applied particularly advantageously in the case of a comparably small storage capacity of the catalytic converter for selective catalytic reduction for ammonia, as is the case at high temperatures of the catalytic converter for selective catalytic reduction. It may therefore be provided that the sequential regeneration of the first nitrogen oxide storage catalytic converter and the second nitrogen oxide storage catalytic converter takes place only above a predefined first temperature of the catalytic converter for selective catalytic reduction.

According to one preferred embodiment variant of the present invention, it may be provided that at a temperature of the catalytic converter for selective catalytic reduction which is below a predefined second temperature for regeneration of the nitrogen oxide storage catalytic converters, the first part of the exhaust gas in the first exhaust bank and the second part of the exhaust gas in the second exhaust bank are set to rich and that the gasoline engine is imperatively operated lean for a predefined time period immediately after the regeneration of the nitrogen oxide storage catalytic converters.

The second temperature may in this case correspond to the above-mentioned first temperature.

During the regeneration of the nitrogen oxide storage catalytic converters, a rich exhaust gas having a lambda<1 is set in both exhaust banks, whereby all three nitrogen oxide storage catalytic converters are regenerated at the same time. During the regeneration phase, ammonia is formed at the two three-way catalytic converters. At the nitrogen oxide storage catalytic converters which are directly connected to the three-way catalytic converters, no or only a small amount of nitrous oxide is formed due to the high temperatures prevailing there. In the downstream catalytic converter for selective catalytic reduction, the ammonia which is formed at the three-way catalytic converters is stored so that no ammonia is present at the third nitrogen oxide storage catalytic converter and thus no nitrous oxide is formed. The regeneration phase is continued until all three nitrogen oxide storage catalytic converters are regenerated.

In the lean phase which now follows and is imperatively predefined according to the present invention, a part of the nitrogen oxides which are generated in the process reacts with the ammonia which is stored in the catalytic converter for selective catalytic reduction. The ammonia is thus not discharged due to a temperature increase of the catalytic converter for selective catalytic reduction, for example, during a rich operating phase of the gasoline engine which follows the regeneration and is conveyed to the third nitrogen oxide storage catalytic converter, whereby the formation of nitrous oxide is prevented.

The method variant is particularly advantageous at comparably low temperatures of the catalytic converter for selective catalytic reduction and the high ammonia storage capacity associated with it and thus complements the previously described, sequential regeneration of the nitrogen oxide storage catalytic converters.

The object of the present invention which relates to the device is achieved in that a circuit or a program sequence is provided in the control unit for setting a rich exhaust gas in the first exhaust bank and a lean exhaust gas in the second exhaust bank during a first regeneration phase of the nitrogen oxide storage catalytic converters and for setting a lean exhaust gas in the first exhaust bank and a rich exhaust gas in the second exhaust bank during a second regeneration phase of the nitrogen oxide storage catalytic converters. The device thus allows for the described method to be carried out.

DETAILED DESCRIPTION OF THE INVENTION

Figure 1:
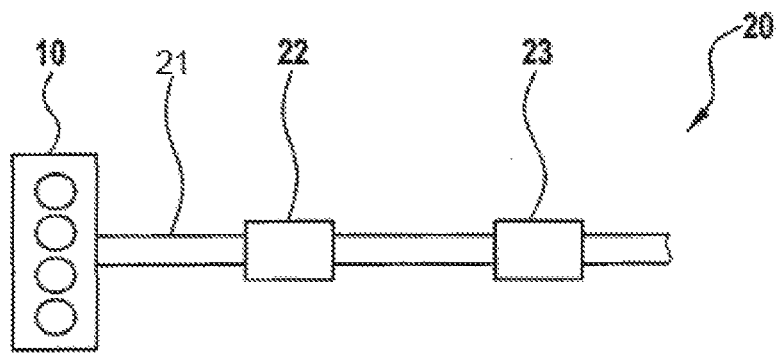
FIG. 1 shows a schematic representation of a gasoline engine including a single-flow exhaust aftertreatment system.

FIG. 1 shows a schematic representation of a gasoline engine 10 which is operated predominantly lean and includes a single-flow exhaust aftertreatment system 20. In this case, the exhaust gas of gasoline engine 10 is initially supplied in an exhaust gas tract 21 to a three-way catalytic converter 22 and subsequently, to a nitrogen oxide storage catalytic converter 23.

The exemplary embodiment shows the sequence in principle for the formation of nitrous oxide using the example of a known, single-flow exhaust system.

Three-way catalytic converter 22 is used for exhaust emission control in the stochiometric operation of gasoline engine 10. Nitrogen oxides which are formed during the lean operation of gasoline engine 10 are stored in nitrogen oxide storage catalytic converter 23. When the storage capacity of nitrogen oxide storage catalytic converter 23 is exhausted, the latter is regenerated through an operation of gasoline engine 10 using a rich air/fuel mixture at a lambda value of <1.

During the regeneration of nitrogen oxide storage catalytic converter 23 at lambda<1, ammonia ($NH_3$) may be formed in secondary reactions at three-way catalytic converter 22 under certain conditions of the engine such as at a comparably low temperature of three way catalytic converter 22. The ammonia causes nitrous oxide (laughing gas, $N_2O$) to be formed in downstream nitrogen oxide storage catalytic converter 23. Nitrous oxide has a very high global warming potential, which is why its emission is subject to a strict limiting value, for example in the USA.

For diesel engines, it is known to provide a catalytic converter for selective catalytic reduction (SCR catalytic converter), which is not illustrated here, between three-way catalytic converter 22 and nitrogen oxide storage catalytic converter 23. The SCR catalytic converter is used to reduce the nitrogen oxide emissions which arise during the provided, lean operation of diesel engines. For this purpose, ammonia is formed from an aqueous urea solution, which is supplied to the exhaust gas, and then converted into nitrogen and water in the SCR catalytic converter using the nitrogen oxides which are contained in the exhaust gas. The SCR catalytic converter thus also prevents the ammonia which is formed at three-way catalytic converter 22 from reaching nitrogen oxide storage catalytic converter 23 and from being converted there into nitrous oxide.

Figure 2:
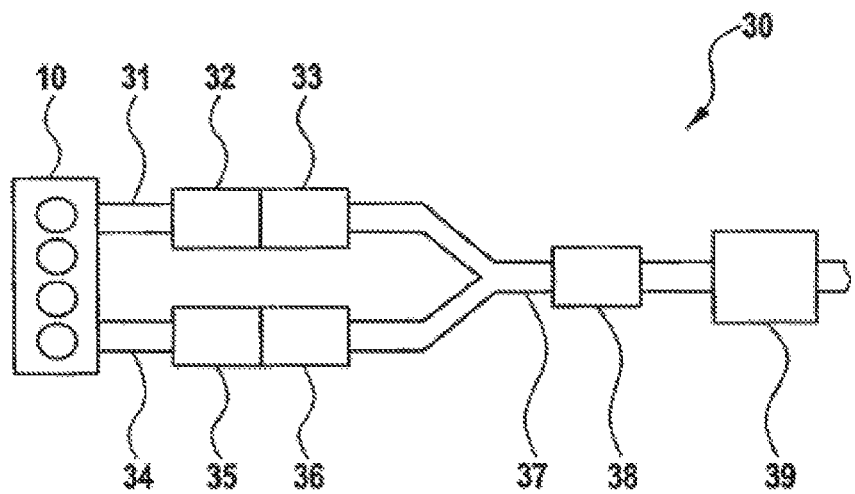
FIG. 2 shows a schematic representation of a gasoline engine including an exhaust aftertreatment system in the design of a Y system.

FIG. 2 shows a schematic representation of a gasoline engine 10 including an exhaust aftertreatment system 30 in the design of a Y system.

Exhaust aftertreatment system 30 is implemented as a Y system in two exhaust banks 31, 34, which are close to the engine and which are assigned to two cylinder groups of gasoline engine 10, and a downstream, shared exhaust gas tract 37. In first exhaust bank 31, a first three-way catalytic converter 32 is situated and directly followed by a first nitrogen oxide storage catalytic converter 33. In second exhaust bank 34, a second three-way catalytic converter 35 is situated and directly followed by a second nitrogen oxide storage catalytic converter 36. In shared exhaust gas tract 37, a catalytic converter 38 for selective catalytic reduction of nitrogen oxides using ammonia as the reduction agent is provided as well as a downstream third nitrogen oxide storage catalytic converter 39 as the main nitrogen oxide catalytic converter.

In such a Y system, ammonia is formed at the two three-way catalytic converters 32, 35 during the regeneration of nitrogen oxide storage catalytic converters 33, 36, and 39 having lambda<1. At catalytic converter 38 for selective catalytic reduction, the ammonia is broken down, whereby no or only a small amount of nitrous oxide is generated in third nitrogen oxide storage catalytic converter 39. For the ammonia to be converted in nitrogen oxide storage catalytic converter 39, nitrogen oxides from the exhaust gas are necessary, such as the ones generated during lean operation of gasoline engine 10. If after the regeneration of nitrogen oxide storage catalytic converters 33, 36, and 39 a lean operation does not take place as is possible in gasoline engines as a function of the operating situation, ammonia remains stored, in particular, at a low temperature of catalytic converter 38 for selective catalytic reduction. This ammonia is then discharged at higher temperatures of catalytic converter 38 for selective catalytic reduction and conveyed, together with the exhaust gas, to third nitrogen oxide storage catalytic converter 39, where it is converted into nitrous oxide.

It is therefore provided according to the present invention that during the regeneration of nitrogen oxide storage catalytic converters 33, 36, and 39, one exhaust bank 31, 34 is operated rich and the other exhaust bank 31, 34 is operated lean at the same time. For this purpose, first exhaust bank 31 is initially operated rich during the regeneration, for example, and first nitrogen oxide storage catalytic converter 33 and third nitrogen oxide storage catalytic converter 39 are regenerated during this time. Ammonia is formed at first three-way catalytic converter 32 in the process. At first nitrogen oxide storage catalytic converter 33 which directly follows first three-way catalytic converter 32, there is no or only very little formation of nitrous oxide due to the relatively high temperatures. Second exhaust bank 34 is operated slightly lean and therefore, a nitrogen oxide mass flow is generated in second bank 34. In following catalytic converter 38 for selective catalytic reduction, the ammonia of first exhaust bank 31 reacts with the nitrogen oxide of second exhaust bank 34. Consequently, nitrous oxide cannot form at third nitrogen oxide storage catalytic converter 39. The exhaust gas which is conveyed in first exhaust bank 31 must be sufficiently rich in order to also allow for a regeneration of third nitrogen oxide storage catalytic converter 39 and to prevent a nitrogen oxide slip. After the regeneration of first nitrogen oxide storage catalytic converter 33 and an at least partial regeneration of third nitrogen oxide storage catalytic converter 39, the exhaust gas of first exhaust bank 31 is initially set to slightly lean. A residual quantity of ammonia is advantageously still stored in catalytic converter 38 for selective catalytic reduction from the rich phase of first exhaust bank 31 for the purpose of reacting with the now present nitrogen oxide. Second exhaust bank 34 which has previously been operated lean is now operated using a rich exhaust gas, and thus second nitrogen oxide storage catalytic converter 36 and third nitrogen oxide storage catalytic converter 39 are regenerated. In this case, ammonia which does not react to nitrous oxide at the downstream, second nitrogen oxide storage catalytic converter due to the relatively high temperatures is formed at second three-way catalytic converter 35. In catalytic converter 38 for selective catalytic reduction, the ammonia reacts with the nitrogen oxide of first exhaust bank 31 so that ammonia is now still not present at third nitrogen oxide storage catalytic converter 39 for the formation of nitrous oxide. The regeneration is completed when all three nitrogen oxide storage catalytic converters 33, 36, and 39 are regenerated.

The method may be particularly advantageously used at a comparably high temperature and an accordingly low ammonia storage capacity of catalytic converter 38 for selective catalytic reduction.

In order to also effectively reduce or prevent the formation of nitrous oxide at low temperatures and an accordingly high ammonia storage capacity of catalytic converter 38 for selective catalytic reduction, it is provided in one method variant to operate both exhaust banks 31, 34 rich below a predefined temperature of catalytic converter 38 for selective catalytic reduction for the generation of nitrogen oxide storage catalytic converters 33, 36, and 39 and to imperatively predefine a lean phase of gasoline engine 10 after the regeneration of nitrogen oxide storage catalytic converters 33, 36, and 39.

In this case, both exhaust banks 31, 34 are initially operated rich for the regeneration of nitrogen oxide storage catalytic converters 33, 36, and 39. Ammonia is generated in the process at both three-way catalytic converters 32, 35 in a secondary reaction. At nitrogen oxide storage catalytic converters 33, 36 which directly follow three-way catalytic converters 32, 35, no or only very little formation of nitrous oxide takes place due to the relatively high temperatures. In downstream catalytic converter 38 for selective catalytic reduction, the ammonia which was formed at three-way catalytic converters 32, 35 is stored so that no nitrous oxide is initially formed at third nitrogen oxide storage catalytic converter 39. The regeneration is finished after all three nitrogen oxide storage catalytic converters 33, 36, and 39 have been regenerated. In a following, imperatively predefined lean phase of gasoline engine 10, a part of the nitrogen oxides, which are formed in the process, is reduced at catalytic converter 38 for selective catalytic reduction using the stored ammonia. Therefore, ammonia cannot be discharged from catalytic converter 38 for selective catalytic reduction and conveyed to third nitrogen oxide storage catalytic converter 39 during further operation. The formation of nitrous oxide may thus be largely prevented.

As a result of the sequential procedure during the regeneration of nitrogen oxide storage catalytic converters 33, 36, and 39, the emission of nitrous oxide may be considerably reduced. In this case, the sequential regeneration of first nitrogen oxide storage catalytic converter 33 in first exhaust gas tract 31 and of second nitrogen oxide storage catalytic converter 36 in second exhaust gas tract 34 is advantageously used at a high temperature and the accordingly low ammonia storage capacity of catalytic converter 38 for selective catalytic reduction, while alternatively, the simultaneous regeneration of nitrogen oxide storage catalytic converters 33, 36, and 39 takes place at a low temperature and the accordingly high ammonia storage capacity of catalytic converter 38 for selective catalytic reduction and is followed by a prescribed lean phase of the gasoline engine.

What is claimed is:

1. A method for regenerating nitrogen oxide storage catalytic converters in an exhaust gas tract of a gasoline engine, the method comprising:
   operating the gasoline engine predominantly lean;
   supplying a first part of exhaust gas of the gasoline engine in a first exhaust bank to a first three-way catalytic converter and to a first nitrogen oxide storage catalytic converter connected downstream;
   supplying a second part of the exhaust gas of the gasoline engine in a second exhaust bank to a second three-way catalytic converter and to a second nitrogen oxide storage catalytic converter connected downstream, wherein the exhaust gas is subsequently merged in a shared exhaust gas tract and supplied to a further catalytic converter for selective catalytic reduction and to a third nitrogen oxide storage catalytic converter connected downstream;

operating the first exhaust bank rich during the regeneration, wherein the third nitrogen oxide storage catalytic converter and the first nitrogen oxide storage catalytic converter are regenerated during this time;

operating the second exhaust bank slightly lean so that a nitrogen oxide mass flow is generated in the second bank, wherein in the catalytic converter for selective catalytic reduction, ammonia of the first exhaust bank reacts with nitrogen oxide of the second exhaust bank, so that nitrous oxide cannot form at the third nitrogen oxide storage catalytic converter;

operating slightly lean the first exhaust bank, after the regeneration of the first nitrogen oxide storage catalytic converter and at least a partial regeneration of the third nitrogen oxide storage catalytic converter, wherein a residual quantity of ammonia is stored in the catalytic converter for selective catalytic reduction from the rich operation of the first exhaust bank for reacting with the nitrogen oxide; and operating the second exhaust bank, which has previously been operated lean, using a rich exhaust gas, so that the second nitrogen oxide storage catalytic converter and the third nitrogen oxide storage catalytic converter are regenerated;

wherein the regeneration is completed when all of the nitrogen oxide storage catalytic converters are regenerated.

2. The method as recited in claim 1, wherein during the regeneration, the exhaust gas compositions in the first exhaust bank and in the second exhaust bank are selected to achieve a rich exhaust gas mixture present in the shared exhaust gas tract.

3. The method as recited in claim 1, wherein the sequential regeneration of the first nitrogen oxide storage catalytic converter and the second nitrogen oxide storage catalytic converter takes place only above a predefined first temperature of the catalytic converter for selective catalytic reduction.

4. The method as recited in claim 1, wherein at a temperature of the catalytic converter for selective catalytic reduction which is below a predefined second temperature for the regeneration of the first, second and third nitrogen oxide storage catalytic converters, the first part of the exhaust gas in the first exhaust bank and the second part of the exhaust gas in the second exhaust bank are set to rich.

5. The method as recited in claim 4, wherein the gasoline engine is operated lean for a predefined time period immediately after the regeneration of the first, second and third nitrogen oxide storage catalytic converters.

* * * * *